United States Patent
Ohta

[19]

[11] Patent Number: 5,942,882
[45] Date of Patent: *Aug. 24, 1999

[54] POWER CONTROL DEVICE AND IMAGE FORMING APPARATUS UTILIZING THE SAME

[75] Inventor: Tomoichiro Ohta, Shimizu, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/852,570

[22] Filed: May 7, 1997

Related U.S. Application Data

[63] Continuation of application No. 08/377,788, Jan. 24, 1995, abandoned.

[30] Foreign Application Priority Data

Jan. 28, 1994 [JP] Japan .................................. 6-008302

[51] Int. Cl.⁶ ............................ H02M 3/335; H02M 1/12
[52] U.S. Cl. ............................ 323/282; 323/284; 363/41; 363/21
[58] Field of Search ........................ 363/21, 41; 323/222, 323/282, 283, 284

[56] References Cited

U.S. PATENT DOCUMENTS

| | | | |
|---|---|---|---|
| 3,593,180 | 7/1971 | Paine | 331/10 |
| 3,913,002 | 10/1975 | Steigerwald et al. | 321/2 |
| 3,993,984 | 11/1976 | Penrod | 340/248 |
| 4,045,887 | 9/1977 | Nowell | 361/98 |
| 4,472,672 | 9/1984 | Pacholok | 320/21 |
| 4,598,330 | 7/1986 | Woodworth | 361/8 |
| 4,645,982 | 2/1987 | Takayanagi | 315/307 |
| 4,791,528 | 12/1988 | Suzuki et al. | 361/235 |
| 4,928,055 | 5/1990 | Kaieda et al. | 323/300 |
| 4,940,929 | 7/1990 | Williams | 323/222 |
| 5,371,444 | 12/1994 | Griffen | 315/291 |

*Primary Examiner*—Peter S. Wong
*Assistant Examiner*—Bao Q. Vu
*Attorney, Agent, or Firm*—Fitzpatrick, Cella, Harper & Scinto

[57] ABSTRACT

Disclosed is a power control device in which, to prevent noise generation when a load is driven by an AC power source, a reactor, the load, and a switching element are connected in series to the output of a rectifier, a diode element being connected in parallel to the reactor and the load, the switching element being driven at a frequency higher than that of the AC power source. Further disclosed is an image forming apparatus utilizing this power control device.

14 Claims, 7 Drawing Sheets

FIG. 1

FIG. 2(a) INPUT VOLTAGE CURRENT WAVEFORMS

FIG. 2(b) VOLTAGE/CURRENT WAVEFORMS AFTER RECTIFICATION

FIG. 2(c) DRAIN CURRENT WAVEFORM AND MEAN CURRENT WAVEFORM

FIG. 2(d) GATE DRIVE PWM

FIG. 2(e) DRAIN-SOURCE VOLTAGE

FIG. 2(f) HEATER AND L1 CURRENT WAVEFORM

POWER CONTROL DEVICE AND IMAGE FORMING APPARATUS UTILIZING THE SAME

This application is a continuation of application Ser. No. 08/377,788, filed Jan. 24, 1995, now abandoned.

BACKGROUND OF THE INVENTION

1. Field of the Invention

The present invention relates to a power control device which adjusts AC input voltage to control electric power to be applied to a load. The present invention also relates to an image forming apparatus, such as an electrophotographic apparatus, which utilizes this power control device.

2. Description of the Related Art

Figure 7:
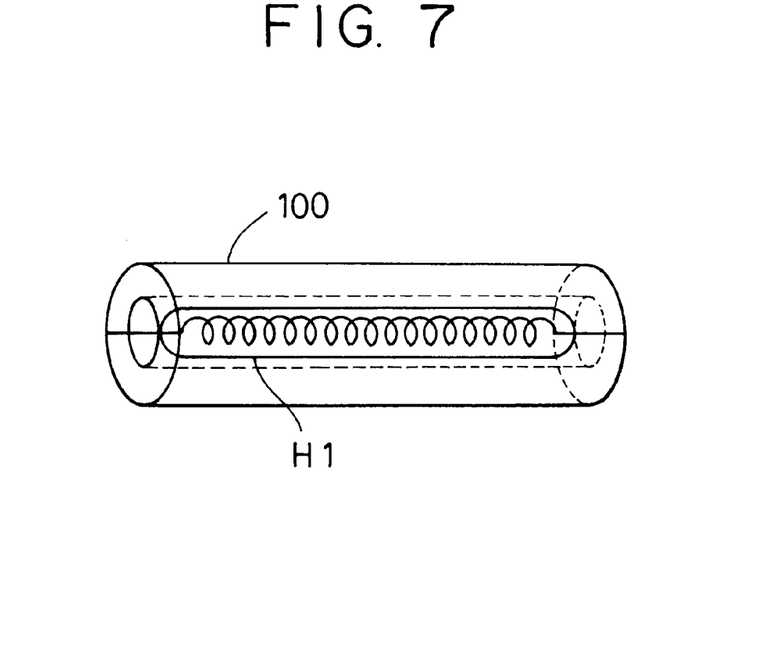
FIG. 7 is a diagram showing an example of a fixing roller.
Figure 8:
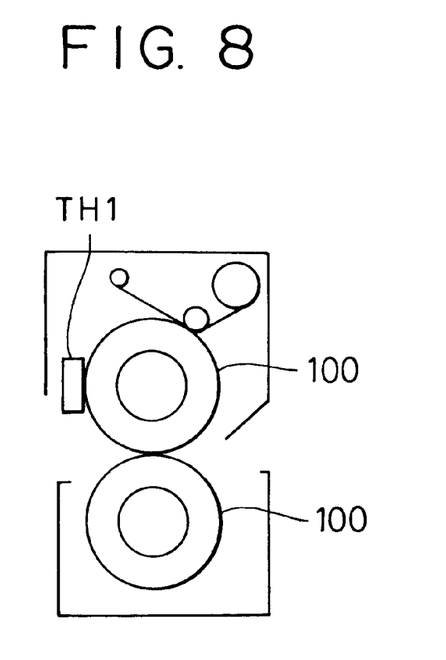
FIG. 8 is a diagram showing the structure of a fixing device.

An electrophotographic apparatus has image forming means for forming a visual image (hereinafter referred to as a "toner image") on recording paper by means of an image developing material (hereinafter referred to as "toner"). The recording paper having a toner image formed thereon is fed to a fixing unit, in which the recording paper is passed through a nip formed by opposing heating rollers 100 as shown in FIG. 8. The heating rollers 100 use heaters H1 as shown in FIG. 7 to heat the recording paper to thereby fix the toner image to the recording paper. In this way, an image is formed on the recording paper. In fixing toner to recording paper by such a heating/fusion device, it is necessary for the surface temperature of the heating rollers of the fixing unit to be correctly controlled so as to be kept at a fixing temperature which is higher than the melting point of the toner but which does not adversely affect the recording paper.

Figure 5:
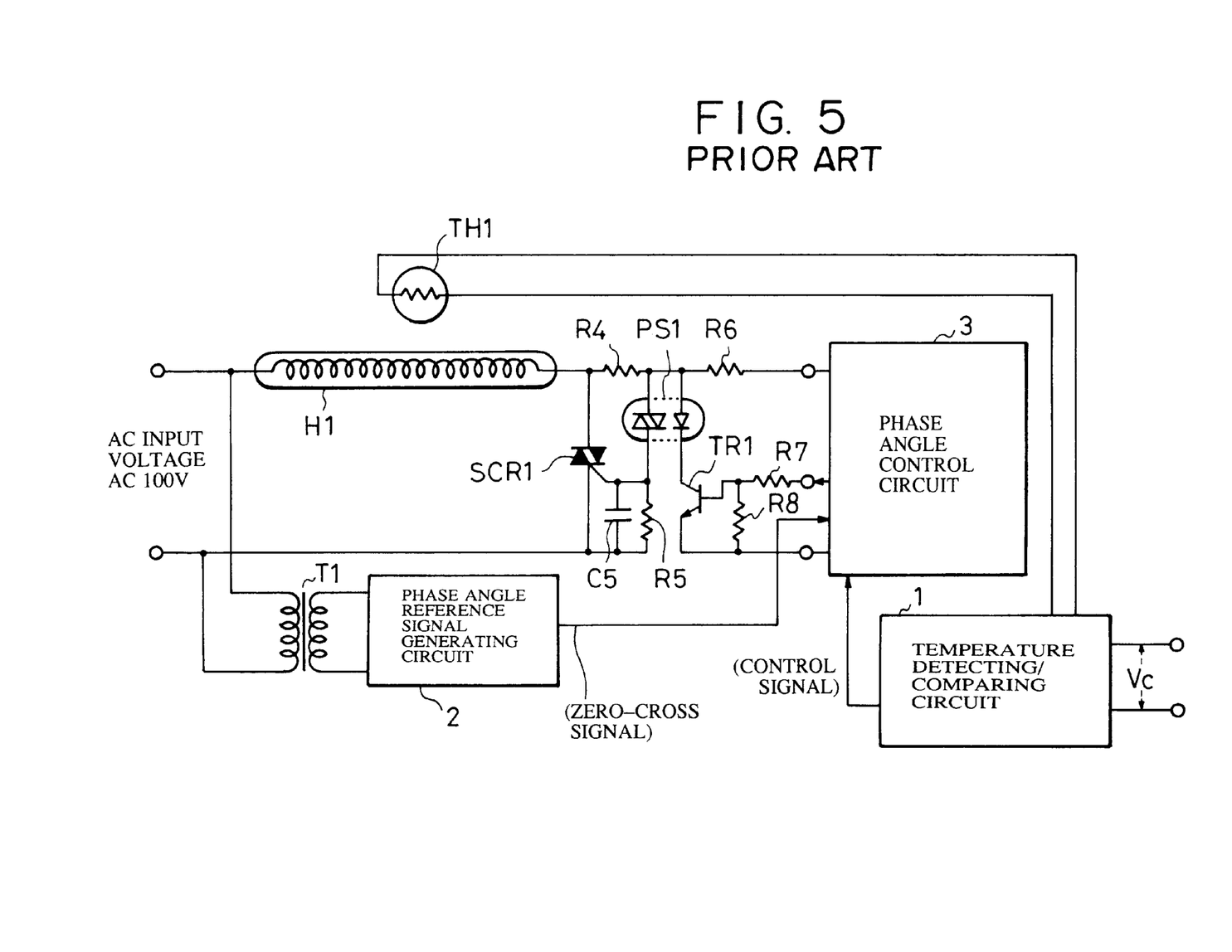
FIG. 5 is a diagram showing a prior-art example.

In view of this requirement, a temperature regulation method based on a phase angle control (also referred to as "phase control") system as shown in FIG. 5 is widely used. In the following, the circuit shown in FIG. 5 and the operation thereof will be described.

When an AC voltage is applied between input terminals, an AC voltage that is insulation-divided by a transformer Ti is input to a phase angle reference signal generating circuit 2, and a phase signal at a zero cross point of AC input is output.

When a temperature adjusting reference voltage Vc is input to the input of a temperature detecting/comparing circuit 1, the temperature detecting/comparing circuit 1 reads a temperature signal from a temperature detecting device TH1, such as a thermistor, for measuring the surface temperature of the fixing rollers and compares it with the temperature adjusting reference voltage Vc, and outputs a voltage in proportion to the difference therebetween to a phase angle control circuit 3 as a control signal.

Figure 6:
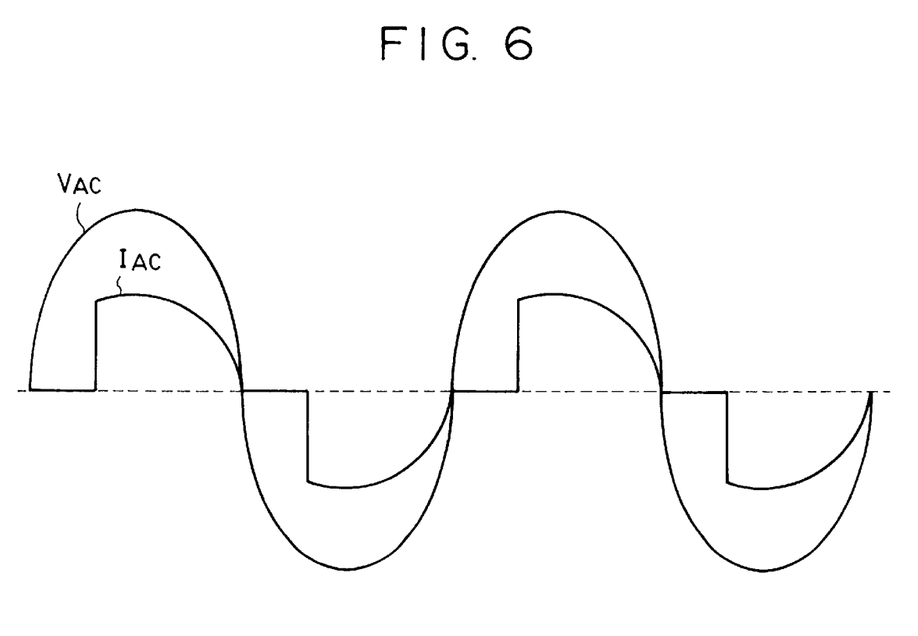
FIG. 6 is a waveform chart of the prior-art example.

The phase angle control circuit 3 determines an energization phase angle from the value of the control signal at this time, and supplies electric current to the base of a transistor TR1 with a timing delayed with respect to the timing of the zero cross signal from the phase angle reference signal generating circuit 2 by an amount corresponding to the phase angle control. This current supply to the base of the transistor TR1 turns on the transistor TR1, whereby a photocoupler PS1 is also turned on, and a current flows to the gate of a TRIAC SCR1 to turn on the SCR1, thereby causing an AC current $I_{AC}$ as shown in FIG. 6 to be supplied to the heaters H1. In this way, an AC current $I_{AC}$ as shown in FIG. 6 is applied to the heaters H1.

When the temperature detection voltage of the temperature detecting device TH1 is lower than the temperature adjusting reference voltage Vc, the control signal is enlarged, and the energization phase angle of the phase angle control circuit 3 is enlarged to increase the power to be applied to the heaters H1, with the result that the heat generation amount increases to raise the surface temperature of the fixing rollers.

When the temperature detection voltage of the temperature detecting device TH1 is higher than the temperature adjusting reference voltage Vc, the value of the control signal is diminished, and the energization phase angle of the phase angle control circuit 3 is diminished to reduce the power to be applied to the heaters H1, with the result that the heat generation amount decreases to lower the surface temperature of the fixing rollers 100.

By the above-described operations, it is possible to control the surface temperature of the fixing rollers 100 so as to keep it at a value that is in proportion to the temperature adjusting reference voltage Vc.

In keeping the temperature of the fixing rollers or the like at a fixed temperature through AC power control, a phase angle control system using an electric power controlling device like TRIAC as shown in FIG. 5 proves itself excellent in terms of controllability. However, as shown in FIG. 6, such a power control device effects power control by cutting off part of the sinusoidal wave of an AC input power, so that, at a certain phase angle, the power control device is abruptly switched from the OFF to the ON state. Due to the voltage spike at the instant of this switching ON, the abrupt rise of the current waveform, etc., harmonic noise over a wide frequency range are generated.

These noise components include a lot of low-frequency components, so that it is impossible to completely eliminate the noise components even by using a noise filter. Thus, it constitutes one of the impediment factors to EMC (electromagnetic compatibility).

Further, the effective value of the current consumption is naturally high with respect to the power consumption, so that the power factor is also reduced, resulting in an increase in current capacity of the power source system.

To cope with this problem, an ON-OFF control, in which the ON-OFF operations of AC power are repeated on a time scale measured in seconds, has been used in temperature adjusting type heating devices using heaters or the like. This entails a problem that the power consumption amount of the apparatus when the heater in ON is much different from that when it is OFF, with the result that fluctuations are caused in the voltage of the power source system. This causes a flickering phenomenon in which fluorescent lamps, etc. flicker, which is regarded as a problem.

SUMMARY OF THE INVENTION

The present invention aims to provide a power control device in which the above problems in the prior art have been solved, and an image forming apparatus utilizing the same. It is accordingly an object of the present invention to provide a power control device which is relatively free from noise and which exhibits a high power factor, and an image forming apparatus utilizing the same.

In one aspect of the present invention, there is provided a power control device which includes a rectifier for rectifying AC power input, a switching element connected in series to the rectifier, a reactor connected in series to the switching element, and a load connected in series to the switching element, and a diode that is connected in parallel to the series circuit of the reactor and the load, wherein the switching element is driven by a drive signal having a frequency that is higher than the frequency of the power applied to the rectifier and an image forming apparatus equipped with this power control device.

Further, according to the present invention, there is provided a power control device which is equipped with detection and correction means for detecting fluctuations in input AC voltage, and correcting the drive signal supplied to the switching element, and an image forming apparatus equipped with this power control device.

Due to the above constructions, the rectifier is supplied with an electric current over each of the cycles of the output thereof, thereby preventing noises due to a pulse current that flows through the switching element from leaking to the power source side. Further, by correcting the drive signal of the switching element through fluctuations in input voltage, fluctuations in the output due to an instantaneous fluctuation in power voltage can be prevented.

Further, by connecting the output of the rectifier to a noise filter consisting of an LC filter, it is possible to further restrain the noise generation.

Other objects of the present invention will become apparent from the drawings and the following detailed description.

DESCRIPTION OF THE PREFERRED EMBODIMENTS

First Embodiment

Figure 1:
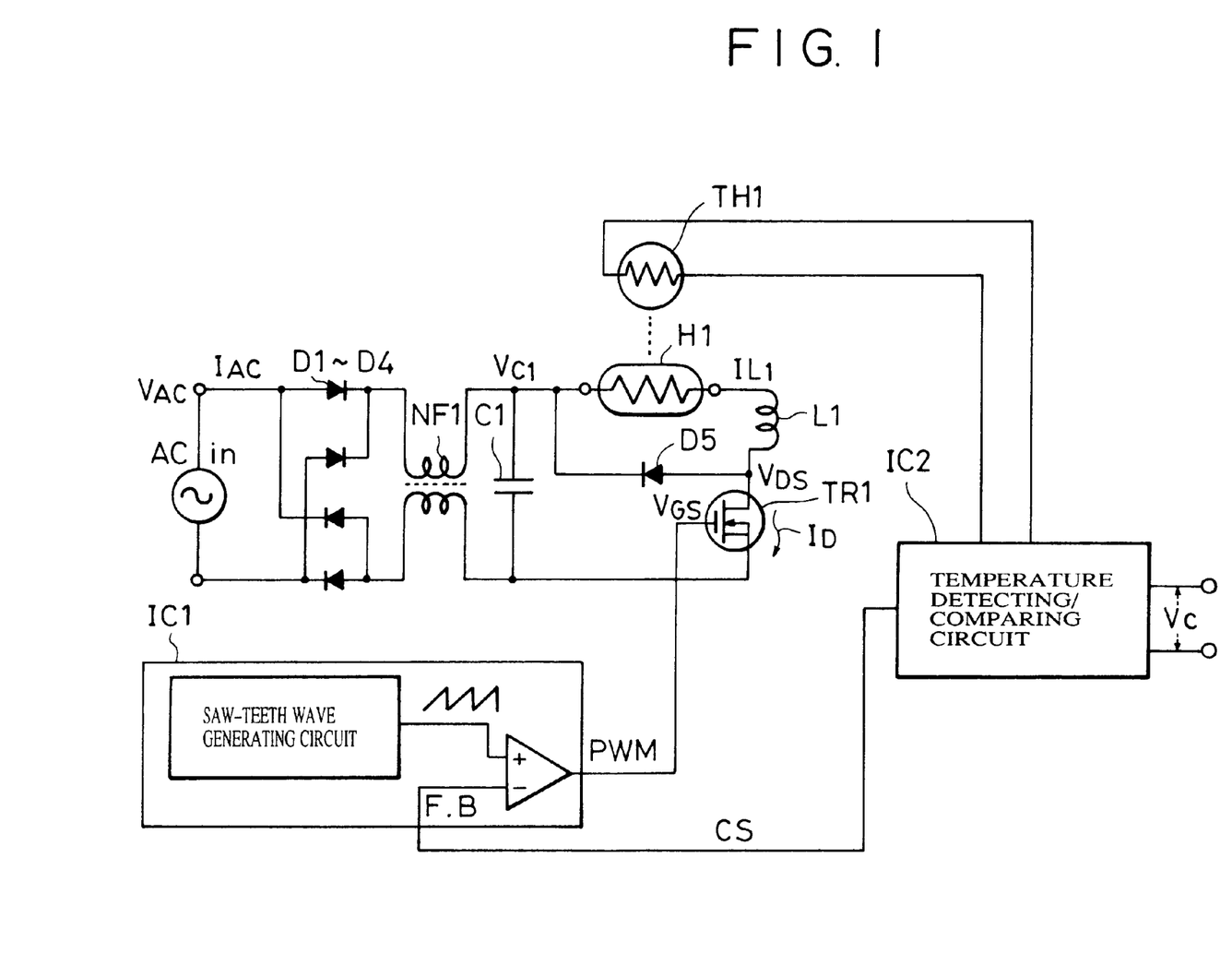
FIG. 1 is a circuit diagram showing a first embodiment of the present invention.

FIG. 1 is a circuit diagram showing a "temperature adjusting device" constituting the first embodiment of the present invention. This temperature adjusting device is used in the fixing device of an electrophotographic apparatus as shown in FIGS. 7 and 8.

FIG. 7 illustrates a heating roller of a fixing device to which the temperature adjusting device of the first embodiment may be applied. The roller 100 includes inside it a heating unit H1.

In FIG. 1, numeral TR1 indicates a MOS-FET of a switching element; numeral L1 indicates an inductor which may serve as a reactor for smoothing a current supplied to a heater H1 constituting the load; and numeral D5 indicates a flywheel diode for regenerating the power stored in the inductor L1. Numeral H1 indicates a heater for heating a fixing roller. The heater H1 is thermally connected to the temperature detecting device TH1 through a structure as shown in FIG. 8. The output of the temperature detecting device TH1 is input to a temperature detecting/comparing circuit IC2.

The temperature detecting/comparing device IC2 compares the output of the temperature detecting device TH1 with a temperature adjusting reference voltage Vc, and inputs the difference therebetween to a pulse width modulation (hereinafter referred to as "PWM") oscillating circuit IC1 as a control signal CS.

The PWM oscillating circuit IC1 generates a PWM pulse having a pulse width corresponding to the value of the control signal, and outputs it to the gate of the MOS-FET of the switching element TR1 to drive the switching element TR1. Numerals D1 through D4 indicate an AC input power rectifying diode which supplies the power control circuit section with a pulsating current as shown in FIG. 2(b). A coil NF1 and a capacitor C1 form a noise filter. A sufficient attenuation amount is secured with respect to the switching frequency of the switching element TR1, and a constant which allows passage without attenuation is set with respect to the power frequency.

Next, the operation of this device will be described.

Figure 2A:
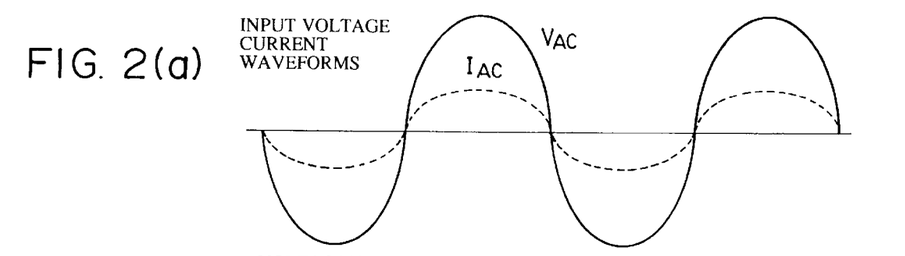
FIGS. 2(a)–(f) are diagrams showing waveforms in the first embodiment.
Figure 2B:
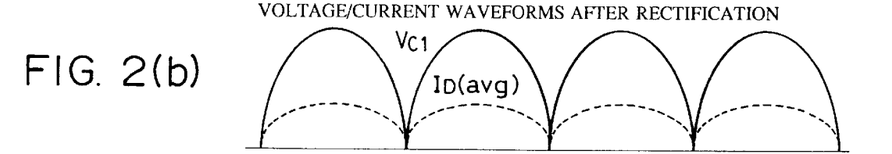

When an AC input voltage $V_{AC}$ as shown in FIG. 2(a) is applied to the input terminal, it is turned into a pulsating current rectified by the rectifying elements D1 through D4, and the voltage is applied to the ends of the capacitor C1. The voltage across the capacitor C1 has a waveform as indicated at $V_{G1}$ in FIG. 2(b).

Figure 2C:
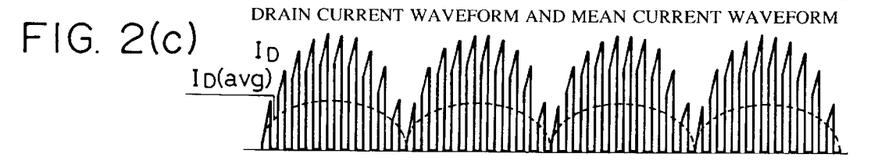
Figure 2D:
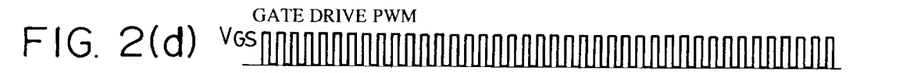
Figure 2E:
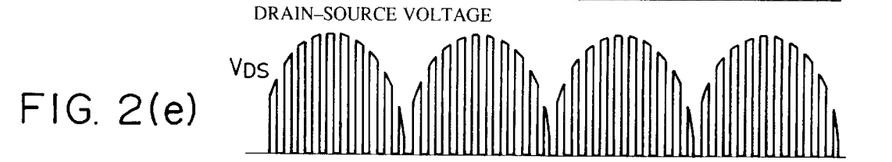

When the temperature adjusting reference voltage Vc is input to the temperature detecting/comparing circuit IC2, the circuit IC2 compares the output of the temperature detecting device TH1 with the temperature adjusting reference voltage Vc, which constitutes the temperature setting value. The difference output obtained by the comparison is supplied to the PWM oscillating circuit IC1 as a control signal. The circuit IC1 (serving as variability means) generates a PWM signal having a pulse width (duty factor) corresponding to the control signal value. The output has a waveform as shown in FIG. 2(d), and is applied between the gate and source of the switching element TR1. The switching element TR1 performs switching by the output pulse of the PWM oscillating circuit IC1, and a drain current $I_D$ as shown in FIG. 2(c) flows to energize the heater H1 and the inductor L1. The drain-source voltage waveform of the switching element TR1 at this time is as shown in FIG. 2(e), in which the voltage Vc1 across the capacitor $C_1$ is cut to the pulse width of the gate.

The inductor L1 stores the current caused to flow as a result of the turning on of the switching element TR1, so that it generates a counter voltage when the switching element TR1 is turned off, and causes a forward current to flow to the flywheel diode D5 to release the stored current into the heater H1, which serves as the load in this embodiment.

Figure 2F:
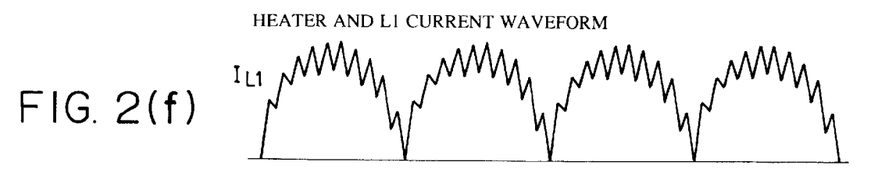

After that, when the switching element TR1 is turned on again, a current flows to the inductor L1 and the heater H1, and the operation of storing current in the inductor L1 is performed again, so that a current having a waveform as shown in FIG. 2(f) flows to the heater H1, and to the inductor L1.

The current flowing to the switching element TR1 makes uniform the waveform of the drain current $I_D$ shown in FIG. 2(c) due to the charging and discharging of the capacitor C1, so that a current having a waveform as indicated by symbol $I_{D(avg)}$ in FIG. 2(c) flows to the coil NF1 of the noise filter.

The current flowing to the rectifying diodes D1 through D4 has a current waveform as obtained by filtering the waveform of the drain current $I_D$ of FIG. 2(c) by the noise filter consisting of capacitor C1 and coil NF1, so that it exhibits a current waveform of $I_{D(avg)}$ as shown in FIG. 2(b). As a result, the AC input current waveform prior to rectification is $I_{AC}$ of FIG. 2(a), which is akin to the AC input voltage waveform, so that it is possible to substantially reduce the harmonic components contained in the input current, thereby making it possible to substantially improve the power factor of the input current of the temperature adjusting device.

The coil NF1 and the capacitor C1, constituting the noise filter used in this circuit, may be of any known type as long as they exert a filtering effect with respect to the high oscillation frequency due to the PWM oscillating circuit IC1. Since the capacity of the capacitor C1 and the inductance value of the coil NF1 can be diminished, it is possible to attain a reduction in size and weight.

Second Embodiment

Figure 3:
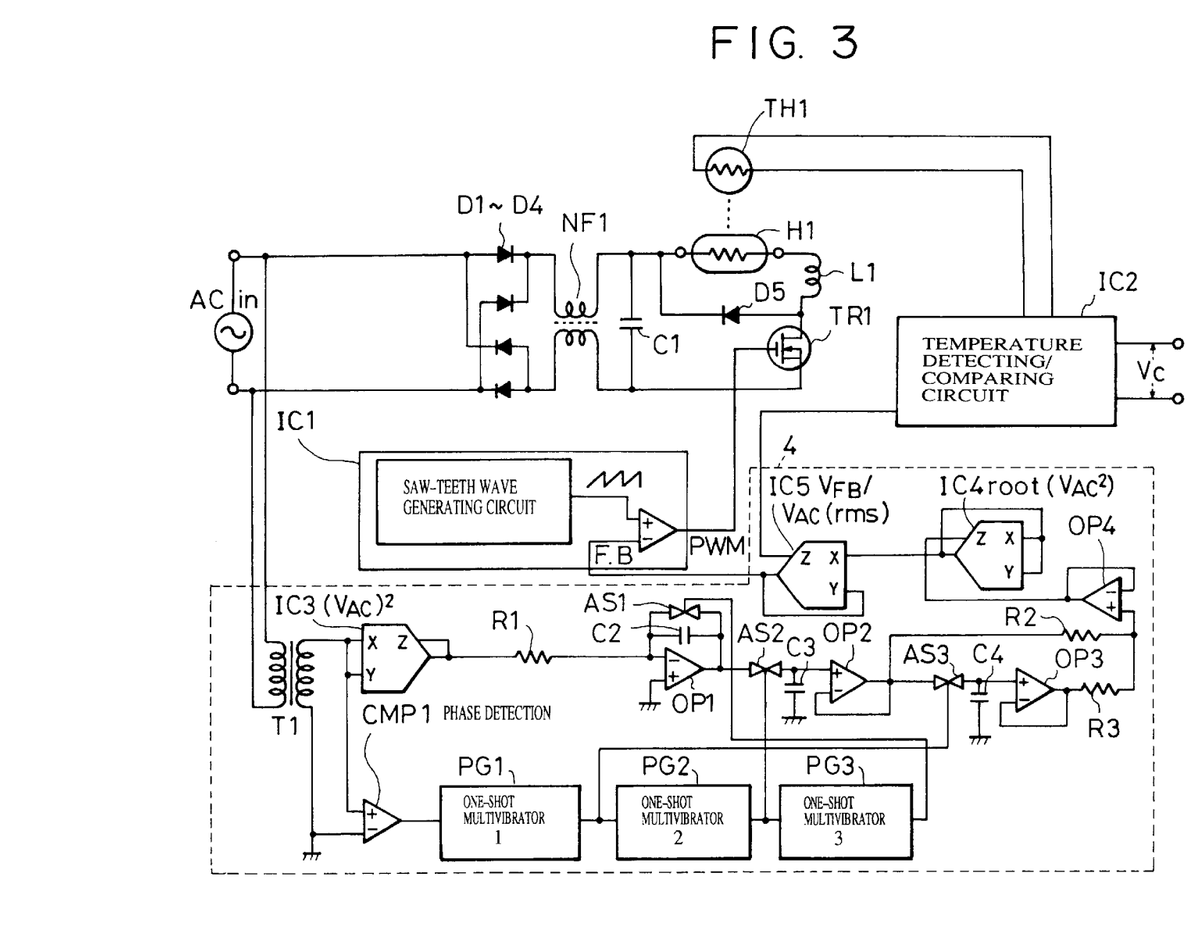
FIG. 3 is a circuit diagram showing a second embodiment of the present invention.

FIG. 3 is a circuit diagram showing a "temperature adjusting device" according to a second embodiment of the present invention. In this embodiment, the controllability of the device of the first embodiment is improved. Like the device of the first embodiment, the second embodiment is applied to a device used for temperature adjustment of the fixing device of an electrophotographic image forming apparatus.

The design of the circuit of FIG. 3 is based on the recognition that, when the energization is effected in the same pulse width on the high-frequency PWM energization control system, the application power of the heater H1 is in proportion to the effective value of the input AC voltage, and, by correcting it, the controllability of the temperature detecting/comparing circuit IC2 is improved, as will be described below.

The circuit of FIG. 3 differs from that of FIG. 1 by including an input AC-voltage effective value conversion control circuit 4, and in that the AC input voltage constituting the input thereof is lowered to the operation voltage level of a multiplication type operational amplifier IC3 by a transformer T1. The output terminal of the transformer T1 is connected to a square circuit consisting of the multiplication type operation amplifier IC3 and to a phase detection circuit consisting of a CMP1. The output of the phase detection circuit CPM1 is inverted each time the AC input voltage crosses over the zero voltage.

The output terminal of the phase detection circuit CPM1 is connected to a one-shot pulse generator PG1, and outputs a small pulse width with the timing of the inversion of AC input voltage. The output of the one-shot pulse generator PG1 is connected to a one-shot pulse generator PG2 and the control terminal of an analog switch device AS3 forming a second sample-and-hold circuit.

The one-shot pulse generator PG2 is triggered by the fall of the pulse output of the one-shot pulse generator PG1 to output a one-shot pulse having a small width. The output terminal of the one-shot pulse generator PG2 is connected to a one-shot pulse generator PG3 and the control terminal of an analog switch device AS2 forming a first sample-and-hold circuit. The one-shot pulse generator PG3 is triggered by the fall of the pulse output of the one-shot pulse generator PG2 to output a one-shot pulse having a small width. The output terminal of the one-shot pulse generator PG3 is connected to the control terminal of an analog switch AS1 for resetting an integration circuit formed by an operational amplifier OP1.

The square of the instantaneous value of an AC waveform, generated by means of the square circuit IC3 from an AC input voltage lowered by the transformer T1, is integrated by an integration circuit consisting of the operational amplifier OP1 and the capacitor C2 through a resistor R1.

At the zero crossing of the AC voltage, the output of the phase detection circuit CMP1 is inverted to generate pulses having a small width in the order: PG1→PG2→PG3, and the analog switch AS1 connected in parallel to the capacitor C2 is turned on to release the charge of the capacitor C2, with the result that the output of the operational amplifier OP1 becomes zero.

As a result, the squares of the instantaneous values, obtained by the square circuit IC3 from the input AC voltage lowered by the transformer T1, are successively integrated by the integration circuit consisting of the operational amplifier OP1 and the capacitor C2, starting from the zero crossing point. When the integration of the half-period portion of the AC input voltage is over, the integrated values of the half-period portion of the squares of the instantaneous values of the input AC voltage have been stored in the capacitor C2 as the output values of the operational amplifier OP1. Further, the output of the phase generation circuit CMP1 is inverted to generate pulses having a small width in the order: PG1→PG2→PG3, as in the above case. The analog switch AS2 is turned on by the pulse generated by the one-shot pulse generator PG2, whereby the squares of the instantaneous values of the input AC voltage, serving as the output values of the operational amplifier OP1, are charged into the capacitor C3. As a result of this operation, the output value of the operational amplifier OP2 is the integrated value of the squares of the half-period portion of the input voltage.

Immediately thereafter the pulses of the one-shot pulse generator PG3 are generated, and the analog switch AS1 connected in parallel to the capacitor C2 is turned on to release the charge of the capacitor C2, so that the output of the operation amplifier OP1 is zero.

When the squares of the next half-period portion of the AC voltage are integrated by the operation amplifier OP1, and zero crossing of the input AC voltage occurs, the output of the phase detection circuit CMP1 is inverted, and, as in the above case, pulses having a small width are generated in the order: PG1→PG2→PG3. Then, the analog switch AS3 is turned on by the pulse of the one-shot pulse generator PG1, and the square-integrated value of the instantaneous values of the previous half-period portion of the input AC voltage are charged into a capacitor C4, with the result that the output value of the operational amplifier OP3 is the square-integrated value of the previous half-period portion of the input AC voltage. After the pulse generation of the one-shot pulse generator PG1, the analog switch AS2 is turned on by the pulse generated by the one-shot pulse generator PG2, with the result that the integrated value of the squares of the instantaneous values of the half-period portion of the input AC voltage is charged into the capacitor C3. Due to this operation, the output value of the operational amplifier OP2 this time is the integrated value of the squares of the half-period portion of the input voltage.

After this, the pulse generation of the one-shot pulse generator PG3 is begun, and the analog switch AS1 connected in parallel to the capacitor C2 is turned on to release the charge of the capacitor C2, with the result that the output value of the arithmetic unit OP1 is zero. This operation is repeated, and, each time a zero cross signal is output, the output of the operational amplifier OP2 becomes the square-integrated value of the half-period portion of the voltage input this time, and the output value of the operational amplifier OP3 is the output value of the square-integrated value of the half-period portion of the previous input voltage.

By adding together the output of the operational amplifier OP2 and the output of the operational amplifier OP3 by means of resistors R2 and R3 and an operational amplifier OP4, the square-integrated value corresponding to one period of the input AC voltage is obtained.

The square-integration output corresponding to one period of the operational amplifier OP4 is input to the square root circuit formed by a multiplication type operational amplifier IC4, with the result that the output of the multiplication type operational amplifier IC4 is the effective one-period input voltage value composed of the AC input voltage of the previous half period and that of the half period input this time.

Thereafter, the effective value output of the input AC voltage by the multiplication type operational amplifier IC4 is input to the denominator side of the dividing circuit formed by a multiplication type operational amplifier IC5, and the control signal value from the temperature detecting/comparing circuit IC2 is connected to the numerator side of the multiplication type operational amplifier IC5, and the value obtained by dividing the input voltage of the control signal voltage by the effective value of the input voltage, is used as the input signal of the PWM oscillating circuit IC1.

By thus dividing the control signal by the detected effective value of the input voltage, the voltage which is input to the PWM oscillating circuit IC1 when, for example, the input voltage increases, is lowered, and the PWM pulse width is reduced, whereby the current applied to the heater H1 is substantially kept at a fixed value, and the heat generation amount does not fluctuate, thereby making it possible to restrain fluctuations in the surface temperature of the fixing rollers. Accordingly, AC voltage effective valve conversion control circuit 4 serves as a fluctuation detection and correcting means.

Further, when the input voltage is lowered, the input voltage of the PWM oscillating circuit IC1 increases by an operation reverse to the above, and the PWM pulse width increases, whereby the fluctuations in the current flowing to the heater H1 are restrained, and fluctuations in the heat generation amount, are also restrained. By using such an effective value conversion control circuit for input power detection and control, it is possible to correctly compute the energization amount based on the effective voltage corresponding to one period even when the AC input voltage waveform is distorted, thereby making it possible to correctly control the heat generation of the heater, etc. and achieving an improvement in terms of temperature stability.

Third Embodiment

Figure 4:
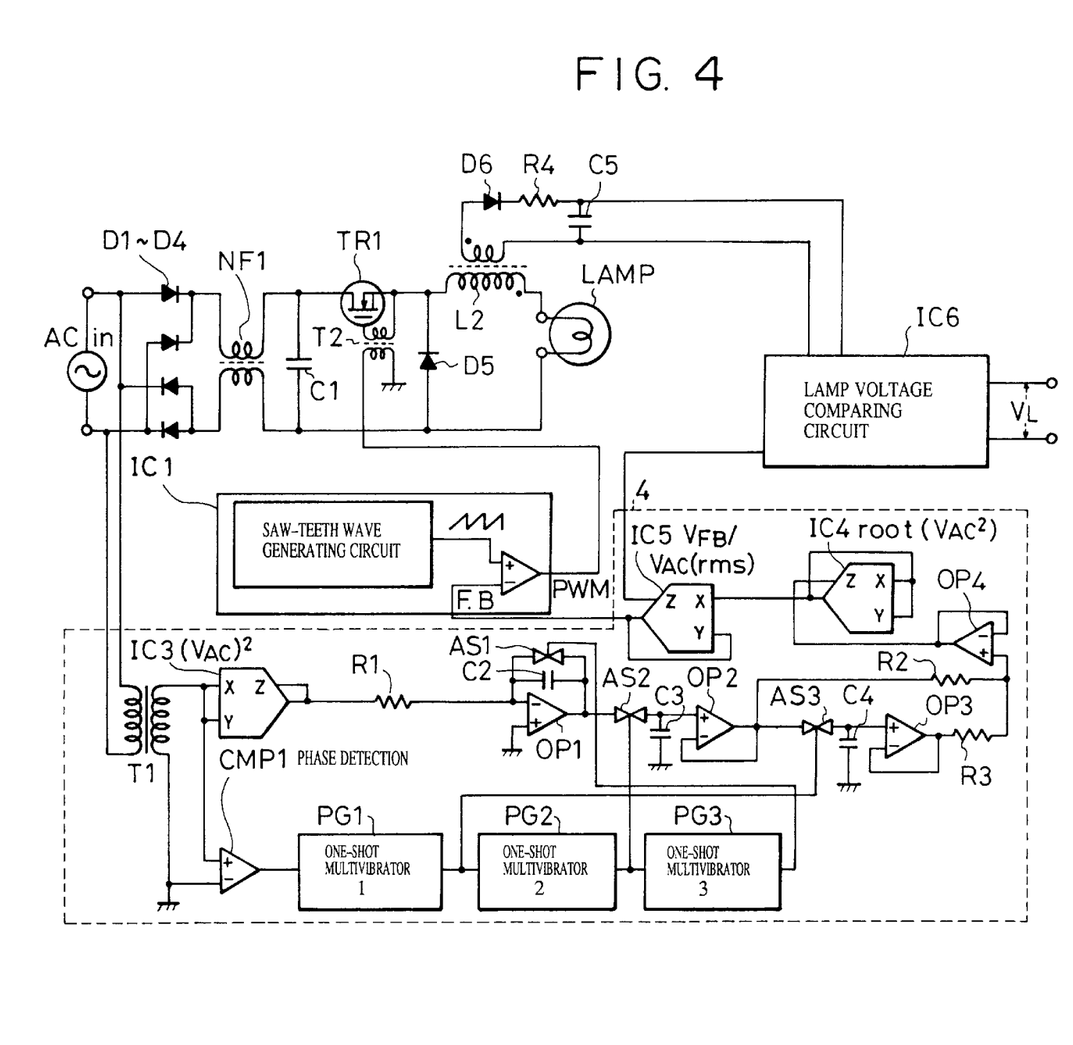
FIG. 4 is a circuit diagram showing a third embodiment of the present invention.

FIG. 4 is a circuit diagram showing an "illumination control device" constituting the third embodiment of the present invention. In this embodiment, the object of control is the light quantity of a lamp serving as a light source for illuminating a document and the like. In this embodiment, the harmonic current of an AC input current is cut off.

This circuit rectifies an AC input voltage by diodes DI through D4 and applies it to the drain of the MOS-FET of TR1, serving as a switching element, through a high-frequency noise filter formed by the coil NF1 and capacitor C1.

The source of the switching element TR1 supplies electric power to a lamp by way of an inductor L2. A diode D5 connected to the inductor L2 and the source of the switching element TR1 is a flywheel diode which regenerates the current stored in the inductor L2 when the switching element TR1 operates in accordance with the output of the gate drive insulating transformer T2. The inductor L2 is equipped with a coil for detecting a voltage applied to the lamp. It performs voltage detection by a diode D6, a resistor R4 and a capacitor C5 and outputs the voltage to a lamp voltage comparing circuit IC6.

When the light quantity reference voltage $V_L$ is input, the lamp voltage comparing circuit IC6 compares it with the lamp voltage detected by the inductor L2, and outputs the difference as the control voltage.

The control voltage is supplied to the numerator side of the multiplication type operational amplifier IC5 of the input-AC-voltage effective value conversion control circuit, and a value is obtained by dividing the control voltage by the effective value of the input AC voltage, and this value is used as the input signal of the PWM oscillating circuit IC1.

The effective value of the input AC voltage is divided by the detected value. As a result, the voltage input to the PWM oscillating circuit IC1 decreases when, for example, the input voltage increases, with the result that the width of the output PWM pulse decreases, whereby the current input to the lamp is substantially kept at a constant value, and the range of variation in the light generation quantity is reduced.

In particular, when the input voltage is abruptly changed, it takes significant time for the lamp voltage to stabilize at a level of approximately several to ten and several waves in terms of input AC waveform in the case of an ordinary method based on lamp voltage detection feedback, whereas, in this embodiment, the effective input voltage is computed and output in a waveform corresponding to one period after the input AV voltage fluctuation, so that it is possible for the control voltage supplied to the PWM oscillating circuit IC1 to be a value corresponding to the fluctuation in the input AC voltage due to the action of the divider IC5, whereby the light quantity of the lamp can be adjusted to a target control value with approximately two to three waves in terms of input AC waveform, thereby quickly stabilizing the circuit operation.

Further, even when the waveform distortion of the input AC voltage occurs to a large degree, conversion to the voltage of the effective value is reliably effected for control, whereby it is possible to realize an illumination device which can reliably reduce the harmonic component of the input AC current and provide a high power factor and a high level of stability while restraining the variation in light generation quantity of the lamp due to fluctuations in the input AC voltage.

As described above, in accordance with the present invention, it is possible to provide a power control device which is relatively free from noise and exhibits a high power factor.

Further, it is possible to provide a power control device which corrects the drive signal of a switching element in response to fluctuations in the input AC voltage, so that it exhibits a high level of stability even when there is an instantaneous fluctuation in the input AC voltage.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A power control device comprising:
    A) a load drive circuit including:
        a rectifier for rectifying an AC power input;
        a switching element connected in series to an output side of said rectifier;
        a reactor connected in series to said switching element;
        a load connected in series to said switching element;
        a diode element connected in parallel to a series circuit of said reactor and said load; and
        a drive circuit for driving said switching element, said drive circuit generating a drive signal having a frequency higher than the frequency of the AC power;

B) a detection circuit, which is electrically isolated from current through said load drive circuit, for detecting a temperature status of said load, and for producing an output signal based on a comparison of the temperature status with a reference voltage; and C) variability means for varying the duty ratio of the drive signal on the basis of the output signal of said detection circuit.

2. A power control device according to claim 1, wherein said drive circuit is a pulse width modulation oscillating circuit.

3. A power control device according to claim 1, wherein said load is a heater, and said detection circuit detects a temperature of said heater.

4. A power control device according to claim 1, further comprising a noise filter connected in series to said rectifier.

5. A power control device according to claim 4, wherein said noise filter is comprised of a second reactor and a capacitor.

6. A power control device according to claim 1, further comprising fluctuation detection and correcting means for detecting fluctuations in said AC power input and for correcting said drive signal in response to detection of the fluctuation.

7. A power control device according to claim 6, wherein said fluctuation detection and correcting means detects the effective value of said AC power input.

8. An image forming apparatus comprising:

image forming means for forming images; and a power control device for controlling power to said image forming means, comprising:

A) a load drive circuit including:

a rectifier for rectifying an AC power input;

a switching element connected in series to an output side of said rectifier;

a reactor connected in series to said switching element;

a load connected in series to said switching element;

a diode element connected in parallel to a series circuit of said reactor and said load; and a drive circuit for driving said switching element, said drive circuit generating a drive signal having a frequency higher than the frequency of the AC power;

B) a detection circuit, which is electrically isolated from current through said load drive circuit, for detecting a temperature status of said load, and for producing an output signal based on a comparison of the temperature status with a reference voltage; and C) variability means for varying the duty ratio of the drive signal on the basis of the output signal of said detection circuit.

9. An image forming apparatus according to claim 8, wherein said drive circuit is a pulse width modulation oscillating circuit.

10. An image forming apparatus according to claim 8, wherein said load is a heater, and said detection circuit detects a temperature of said heater.

11. An image forming apparatus according to claim 8, further comprising a noise filter connected in series to said rectifier.

12. An image forming apparatus according to claim 11, wherein said noise filter is comprised of a second reactor and a capacitor.

13. An image forming apparatus according to claim 8, further comprising fluctuation detection and correcting means for detecting fluctuations in said AC power input and for correcting said drive signal in response to detection of the fluctuation.

14. An image forming apparatus according to claim 13, wherein said fluctuation detection and correction means detects the effective value of said AC power input.

* * * * *